June 5, 1923.                                                          1,457,861
F. STEBLER
FRUIT CLEANER
Filed Sept. 5, 1922
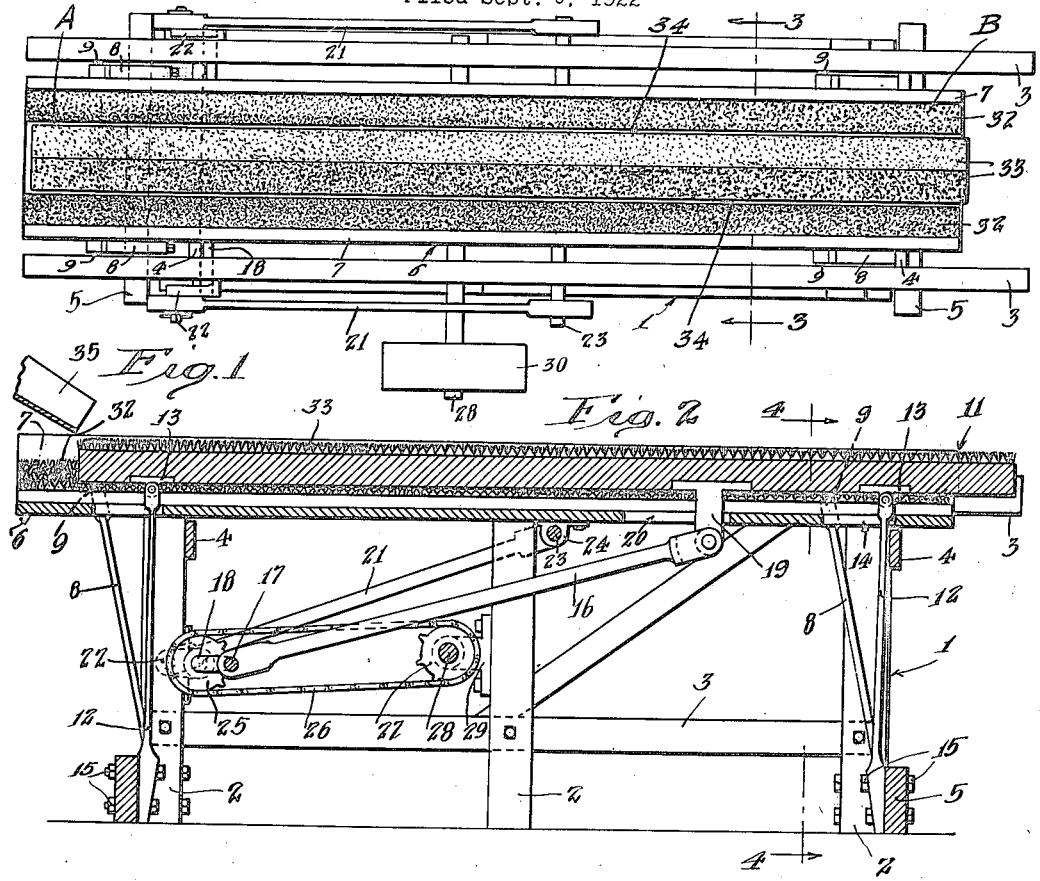
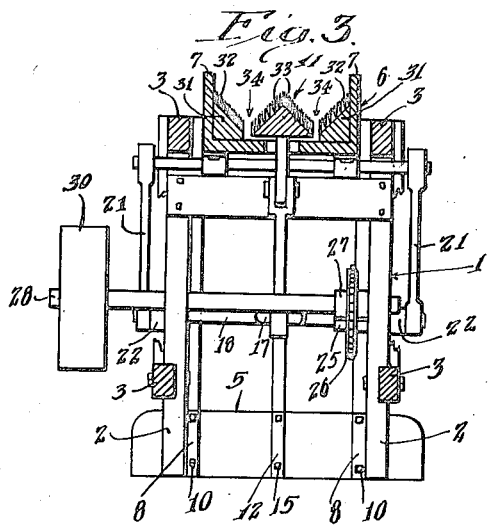
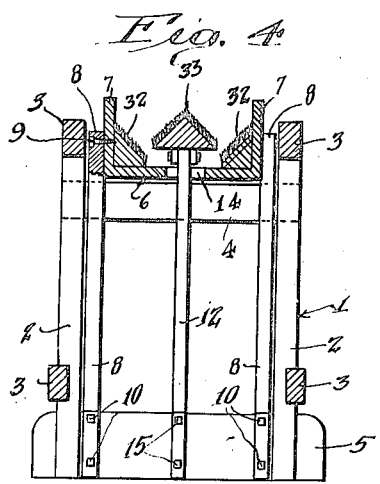
Inventor
Fred Stebler
By Lyon & Lyon
attys.

Patented June 5, 1923.

1,457,861

UNITED STATES PATENT OFFICE.

FRED STEBLER, OF RIVERSIDE, CALIFORNIA, ASSIGNOR TO STEBLER PARKER CO., OF RIVERSIDE, CALIFORNIA, A CORPORATION OF CALIFORNIA.

FRUIT CLEANER.

Application filed September 5, 1922. Serial No. 586,374.

*To all whom it may concern:*

Be it known that I, FRED STEBLER, a citizen of the United States, residing at Riverside, in the county of Riverside and State of California, have invented a new and useful Fruit Cleaner, of which the following is a specification.

This invention relates to a device for handling fruit and the like and has for its object to provide a device for cleaning fruit by a scrubbing action of brush members arranged and operated to clean the fruit passing through the device; also to provide a device in which longitudinally extended brushes are arranged to form a fruit receiving trough and are manipulated to give the fruit a rolling action on the brushes; also to provide such a construction as will operate to advance the fruit forward in the trough at each reciprocation of the brushes.

Various other objects and advantages will be more fully apparent from the following description of the accompanying drawings, which form a part of this disclosure and which illustrate a preferred form of embodiment of the invention.

Of the drawings:

Figure 1 is a top plan view of the device.

Fig. 2 is a central longitudinal section.

Fig. 3 is a transverse section on line 3—3 of Fig. 1.

Fig. 4 is a transverse section on line 4—4 of Fig. 2.

In the drawings, 1 designates a frame comprising leg members 2, longitudinal rails 3 and cross members 4 and 5.

In practicing my invention I provide a plurality of longitudinally disposed or parallel brushing bars which are mounted against rotation on their longitudinal axes, their faces being provided with fixed brushes to engage the fruit. I produce a relative longitudinal movement of these bars with respect to each other while the brushes engage the fruit. This operates to roll the fruit and insures the application of the brushes to the entire surfaces of the fruit.

Any suitable means may be provided for effecting a progressive movement of the fruit through the machine. I shall now describe the preferred construction for accomplishing these results.

Positioned between the upper rails 3 is a longitudinally extended table-like member 6 having vertical sides 7 and supported at opposite ends by spring levers 8 having their upper ends pivotally connected at 9 to the sides 7 of said member, the lower ends of the levers 8 being secured to the respective cross members 5 of the frame 1, by bolts 10. A longitudinally extended center member or bar 11 is positioned parallel to the table member 6 and between the sides 7 thereof; any suitable means may be provided for holding this bar against rotation, at the same time permitting its reciprocation. In the present instance it is supported at opposite ends by spring levers 12 having their upper ends pivotally connected to brackets 13 secured to said center member, said levers 12 extending through slots 14 in the table member 6, with their lower ends secured to the respective cross members 5 of the frame 1 by bolts 15. Some means is provided to effect an advance of the fruit through the machine. In the present instance the spring levers support the respective members for longitudinal reciprocation and for vertical vibration in corresponding sequence, that is, by reason of the arc of movement of the upper ends of the levers, each member as it is reciprocated forwardly will be at the same time elevated and as it is returned will be depressed, and as the levers are tensioned as they are moved to substantially vertical position it will be evident that they will have a tendency to speed up the return movement of said members.

I produce a reciprocating movement of the members which support the fruit in such a way as to effect the cleaning of the fruit within the cleaner. I prefer to do this by producing a relative longitudinal movement between the members 6 and 11. As illustrated, the respective members 6 and 11 are simultaneously reciprocated in opposite directions by suitable driving mechanism, and in the present instance such mechanism consists of a connecting rod 16 pivotally connected to a crank pin portion 17 of a crank shaft 18 which is journaled in bearings on the frame 1, with the forward end of said rod 16 pivotally connected to a bracket 19 secured to the center member 11 and extending through a slot 20 in the member 6; and connecting rods 21 each pivotally connected to crank pins 22 on opposite ends of the shaft 18 with their forward ends connected to the outer ends of a transverse shaft 23 journaled in brackets 24 depending from the bottom of the member 6. The shaft 18 has a chain sprocket 25 which is in driving connection by means of a chain 26, with a sprocket 27 on a power shaft 28, the shaft 28 being journaled in brackets 29 on the frame 1 and being provided with a belt pulley and fly wheel 30 for connection with any suitable source of power.

Considering the opposed disposition of the crank pins 17 and 22 as shown in Fig. 2, it will be readily understood that a rotation of the crank shaft 18 will through the connecting rods 16 and 21, effect a longitudinal reciprocation of the two members 6 and 11 in relative opposite directions.

In the opposed longitudinal corners of the member 6 are filler blocks or bars 31 having brushes 32 fixed on their upper surfaces which extend downwardly and inwardly towards each other, and the center member or bar 11 has similar brushes 33 fixed to it, and its faces extend downwardly and outwardly towards the side brushes. These brushes are preferably of fiber and provide scrubbing surfaces which cooperate to form troughs 34 which receive the fruit to be cleaned.

While the device is adapted to clean various kinds of fruits and vegetables or like articles, in the description of the operation I will refer to oranges as the specific fruit being handled, and further while the device is primarily intended to clean the fruit of field dirt, it will be understood that this is merely a term of convenience as it is plain that the device is capable of cleaning the fruit of dirt of any nature adhering thereto.

In use, the device will be continuously driven at a speed which will vary for different fruits and for fruits of different sizes and weights, the proper speed for any specific product being determined by experience of the attendant. The fruit from the field or from any other source of supply, is fed into the troughs 34 at the rear end A of the device preferably by means of a hopper 35, or other suitable device and is propelled towards the discharge end B, each individual orange being subjected, in transit, to the scrubbing action of the brushes. The longitudinal reciprocation of the opposed brushes in opposite directions induces a rolling of the oranges to bring all portions of their periphery in contact with the brushes during their passage through the troughs, and the vertical vibration of the members tend to throw the fruit forwardly on the forward and upward reciprocation of the brushes, said brushes returning during the propelling effect of such forward throw of the fruit.

From the above it will be plain that I have provided a fruit cleaning device in which parallel opposed brushes form a trough to receive fruit to be cleaned, with the brushes longitudinally and vertically vibrated in opposite directions and in corresponding sequence and that by the specific movements of the brushes the fruit will be conveyed through the trough with a rolling action such as will bring all portions of each individual fruit into scrubbing contact with the brushes.

While the form of mechanism illustrated and described is well adapted to fulfill the objects primarily stated, it is not intended to confine the invention to the one form of embodiment herein disclosed, for it is susceptible of embodiment in various other forms, all coming within the scope of the following claims:

I claim:

1. A device of the nature disclosed comprising parallel members having scrubbing surfaces and cooperating to form a receiving trough, means supporting said members for longitudinal reciprocation and for effecting a vertical movement thereof during each reciprocation, and means for reciprocating said members simultaneously in opposite directions.

2. A device of the nature disclosed comprising parallel members having scrubbing surfaces and cooperating to form a receiving trough, independent means supporting each member for longitudinal reciprocation and for movement upwardly during a forward reciprocation and downwardly during a return reciprocation, and means for reciprocating said members simultaneously in opposite directions.

3. A device of the nature disclosed comprising parallel members having scrubbing surfaces and cooperating to form a receiving trough, levers supporting each member for longitudinal reciprocation and arranged to cause an elevation thereof during a forward reciprocation and a depression thereof during a return reciprocation, and means for reciprocating said members simultaneously in opposite directions.

4. A device of the nature disclosed comprising parallel members having scrubbing surfaces and cooperating to form a receiving trough, spring members supporting each member for longitudinal reciprocation and arranged to cause an elevation thereof during a forward reciprocation and a depression thereof during a return reciprocation, and means for reciprocating said members simultaneously in opposite directions.

5. A device of the nature disclosed comprising longitudinally disposed parallel members having opposed scrubbing surfaces cooperating to form a trough, parallel movement devices supporting each member for longitudinal reciprocation and for vertical vibration in corresponding sequence, and means for reciprocating said members simultaneously in opposite directions.

6. A device of the nature disclosed comprising longitudinally disposed parallel members, brushes carried by said members and cooperating to form a trough for receiving fruit and the like, means supporting each member for longitudinal reciprocation and for vertical vibration in corresponding sequence, and means for reciprocating said members simultaneously in opposite directions whereby the fruit will be propelled through the trough and be submitted to a scrubbing action of the brushes during travel through the trough.

7. A device of the nature disclosed comprising a longitudinally disposed member having opposed longitudinal brushes at opposite sides thereof, said brushes extending downwardly and inwardly towards each other, a longitudinally disposed center member having opposed longitudinal brushes extending downwardly and outwardly towards the side brushes and forming therewith troughs, to receive fruit and the like, means supporting said members for longitudinal reciprocation, and means for reciprocating said members simultaneously in opposite directions, whereby the fruit will be propelled through said troughs and be submitted to a scrubbing action of the brushes.

8. In a fruit cleaner, the combination of a plurality of bars held against rotation and for reciprocation in a longitudinal direction, brushes fixed to the bars for engaging the fruit, and means for producing a relative longitudinal movement of the bars with respect to each other while engaging the fruit.

9. In a fruit cleaner, the combination of a pair of bars forming a V-shaped trough, held against rotation and for reciprocation in a longitudinal direction, brushes fixed to the bars for engaging the fruit and means for producing a longitudinal reciprocation of the bars.

Signed at Los Angeles, California, this 8th day of August, 1922.

FRED STEBLER.